Figure 1:
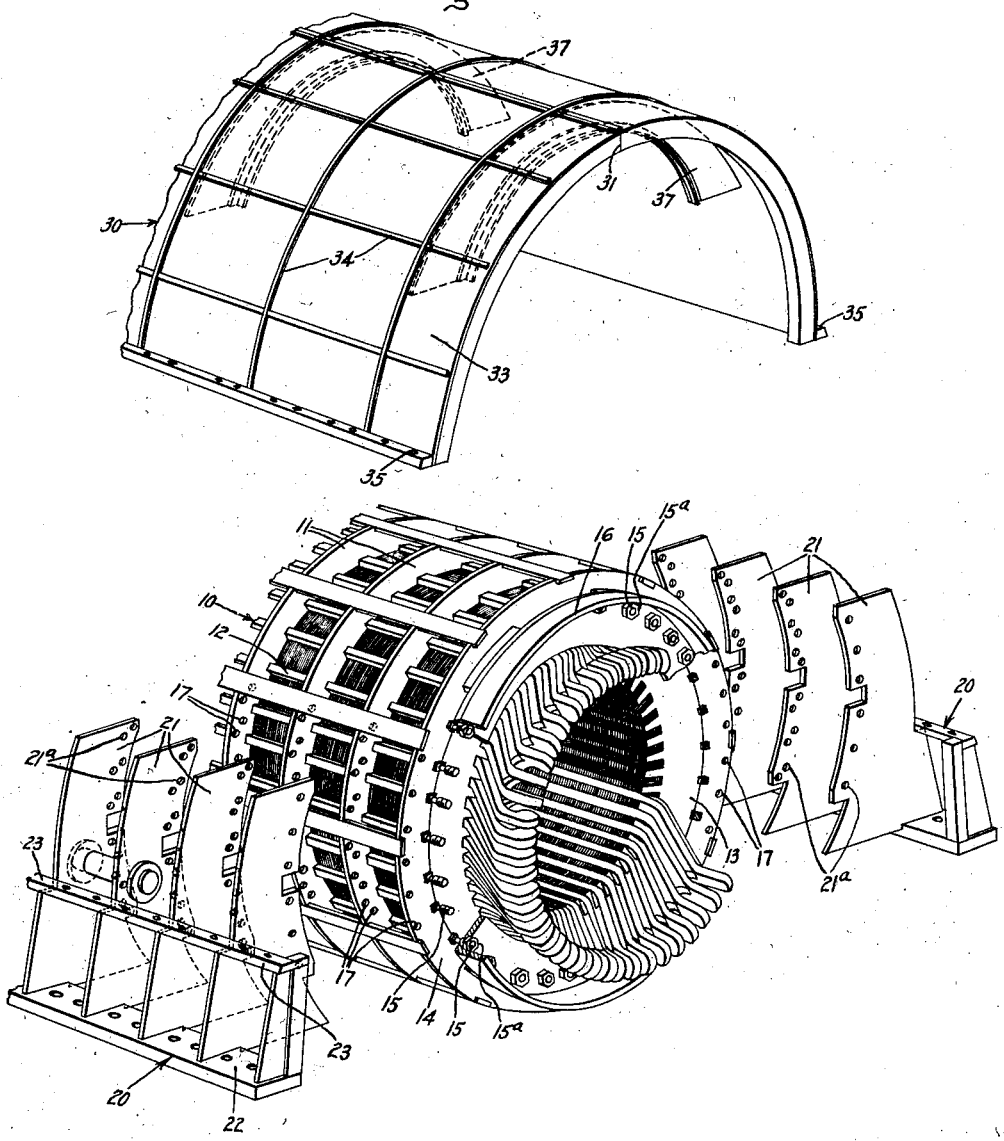

Oct. 30, 1928.

M. A. SAVAGE

STATOR CONSTRUCTION

Filed June 20, 1927

1,689,503

2 Sheets-Sheet 1

Inventor:
Marion A. Savage,
by *[signature]*
His Attorney.

Oct. 30, 1928.                                                            1,689,503
M. A. SAVAGE
STATOR CONSTRUCTION
Filed June 20, 1927                           2 Sheets-Sheet 2
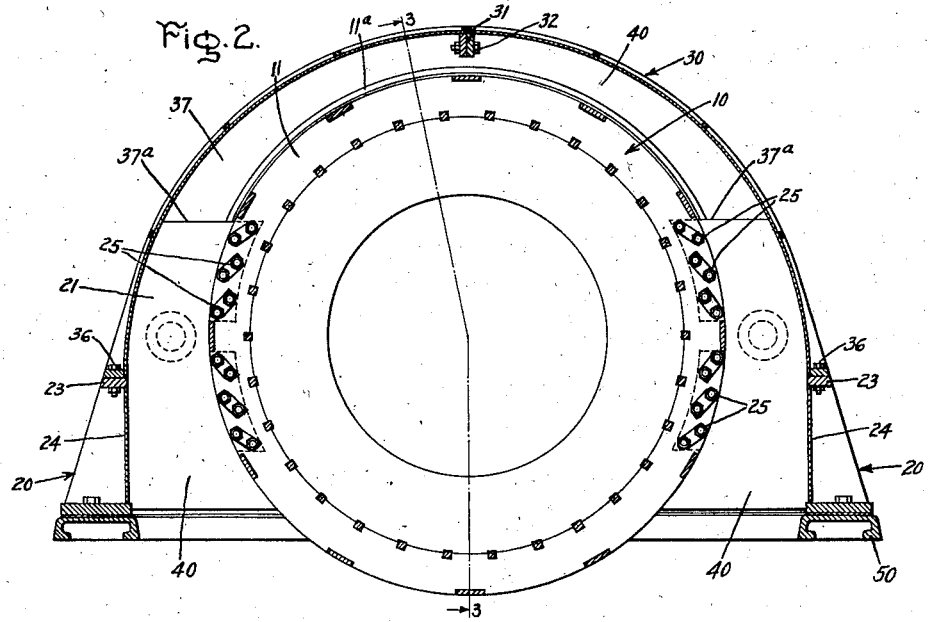
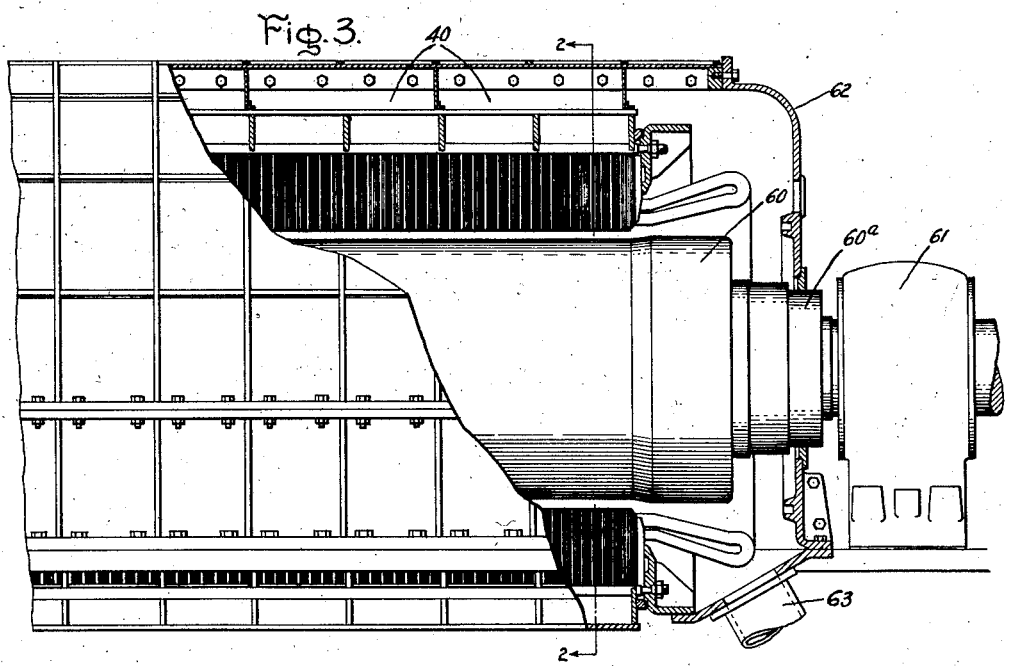
Inventor:
Marion A. Savage,
by *His Attorney.*

Patented Oct. 30, 1928.

1,689,503

UNITED STATES PATENT OFFICE.

MARION A. SAVAGE, OF SCOTIA, NEW YORK, ASSIGNOR TO GENERAL ELECTRIC COMPANY, A CORPORATION OF NEW YORK.

STATOR CONSTRUCTION.

Application filed June 20, 1927. Serial No. 199,896.

My invention relates to an improved stator construction for dynamo-electric machines.

In order not to exceed the capacity as to weight and size of available means of transportation it has been the practice to construct the stators of very large capacity dynamo-electric machines in two or more sectors and ship them from the manufacturing plant to the place of installation where the sectors have been bolted together to form the stator. Constructing a stator in this manner is subject to the disadvantage that it requires accurate machining of the abutting surfaces of the sectors constituting the stator which increases the cost of manufacture. The construction is also subject to the disadvantage that the windings cannot be completed when the sectors are made as this would prevent the sectors being separated for shipment. Consequently it has been necessary during the installation of the machine to put some of the winding coils on the stator and connect them to adjacent coils, already in place, to complete the winding.

The object of my invention is to construct a stator, for use in a dynamo-electric machine of large size, in several parts, one of which comprises an annulus on which the complete winding can be placed during the construction of the machine, so that the accurate machine work formerly required on the abutting surfaces of the sectors will not be necessary, and the completion of the stator winding as part of the work of installing the machine will be avoided.

My invention will be more fully set forth in the following description referring to the accompanying drawings and pointed out with particularity in the claims annexed to and forming a part of this specification.

In the drawing, Fig. 1 is a fragmentary perspective view of the several parts of my improved stator for dynamo-electric machines illustrating the parts partly broken away and separated to more clearly show their structure; Fig. 2 is a transverse section of the stator on the line 2—2 of Fig. 3, omitting the rotor; and Fig. 3 is a fragmentary side elevation of a dynamo-electric machine embodying my invention, partly broken away.

As shown in Fig. 1 of the drawing, my improved stator is constructed in four parts so that even in the case of machines of largest capacity the overall dimensions and weight of each part can be constructed well within the capacity of available means of transportation. These parts comprise an annular structure 10, foot members 20, and a cover structure 30 which is made in two parts secured together at 31.

The annular structure 10 comprises a plurality of annular members 11 which are spaced apart and connected by longitudinally extending tie bars 12 secured to the inner and outer peripheries thereof in any suitable manner, for example by welding or riveting. In this embodiment of my invention the tie bars 12 secured to the inner peripheries of the annular members are adapted to engage dovetailed notches in the laminations 13 for supporting them in the annular structure. The ends of the inner tie bars 12, which extend beyond the end annular member 14, are threaded at 15 so that a lamination clamping cover 16 may be secured thereto by nuts 15$^a$. Inasmuch as the annular structure 10, which may be shipped as a unit from the place where it is manufactured to the place where it is to be installed, includes the stator laminations, the stator winding 18 can be completed when the annular structure is built. The annular members 11 are drilled on each side thereof at 17 so that the foot members 20 can be bolted thereto when it is desired to assemble the stator, as shown in Fig. 2.

The cover structure 30 preferably comprises two parts which are secured together at 31 by bolts 32 or in any other suitable manner, such as welding. Each part of the cover structure comprises a curved plate 33 having reinforcing strips 34 thereon and a flange 35 secured to the lower edge thereof, which in this instance are adapted to be bolted to the foot members 20 at 36, as shown in Fig. 2. The form of the cover structure 30 is such that in the assembled stator it extends about the annular structure 10 in spaced relation thereto so as to form an air passage of adequate capacity for the air which is circulated between the stator laminations. In order to provide for the most effective circulation of air through the completed dynamo-electric machine employing my improved stator, the cover structure 30 is provided with webs 37 which are arranged so that in the completed stator they extend from the cover structure into contact with the annular members 11 of the annular structure 10 so as to form several passages which are preferably interconnected, as disclosed in the United States patent to Holcomb 1,269,537 of June 11, 1918.

The foot members 20 each comprise a plurality of plates 21 spaced apart which are secured, preferably by welding, to a base plate 22 and a side plate 23. The plates 21 are spaced from each other in the same relation as the spaced annular members 11 of the annular structure and are drilled at 21ª so that they can be bolted to the annular structure 10 as indicated at 25 in the completed stator. In the assembled stator, air is prevented from circulating through the stator outwardly between the plates 21, and the base and side plates 22 and 23 by closure plates 24, shown in Fig. 2.

In assembling the parts of my improved stator construction for use in a turbo-generator illustrated in Figs. 2 and 3, the plates 21 of the foot members 20 are bolted at 25 to the annular members 11 and the annular structure 10. The halves of the cover structure 30 are bolted together at 32 after which the cover structure is arranged over the annular structure 10 and bolted at 36 to the side plates 23 of the foot members 20. In this position of the cover structure 30 the webs 37 thereof extend into contact with the annular members 11 at 11ª. The ends of the webs 37 also extend in contact with the plates 21 of the foot members at 37ª. It will thus be seen the cover structure 30 cooperates with the annular structure 10 and the foot member 20 so as to form passages 40 for air circulated between the stator laminations, which extend to the base plates 22, and may be interconnected in any suitable manner, for example as shown in the patent to Holcomb previously referred to. The stator construction is supported on the foot members 20 which are bolted to a base 50 grouted in the usual concrete foundation. The rotor 60 is supported on the foundation by pedestals 61, and the end of the stator is enclosed by an end shield 62 which closely surrounds the shaft 60ª of the rotor. It is preferred to supply air under pressure through a conduit 63 at the end shaft 62 which passes over the rotor and outwardly between the laminations to the air passages 40.

Although I have illustrated a portion of one end of my improved stator and a turbo-generator in which it is employed, it will be understood that the other end of the stator and the turbo-generator are of substantially the same construction.

As many modifications of my improved stator will occur to those skilled in the art, I desire it to be understood that my invention is not limited to the particular arrangement shown and described, and I intend in the appended claims to cover all modifications which do not depart from the spirit and scope of my invention.

What I claim as new and desire to secure by Letters Patent of the United States, is:—

1. A stator for dynamo-electric machines including an annular structure having laminations supported therein, said annular structure comprising a plurality of annular members spaced apart and tie bars connecting them, a cover structure comprising a curved plate having webs thereon, said cover structure extending about said annular structure in such relation that said webs cooperate with the annular members to form ducts for air circulated between said laminations.

2. A stator for dynamo-electric machines including an annular structure having laminations supported therein, foot members on each side of said annular structure attached thereto, and a cover structure secured to said foot members and extending in spaced relation about said annular structure to form a ventilating passage for air circulated between the stator laminations.

3. A stator for dynamo-electric machines including an annular structure having laminations supported therein, foot members on each side of said annular structure attached thereto, and a cover structure comprising a curved plate having webs thereon, said cover structure being secured to said foot members and extending about said annular structure in such relation that said webs cooperate with said annular structure to form ducts for air circulated between the stator laminations.

4. A stator for dynamo-electric machines including an annular structure having laminations supported therein, said annular structure comprising a plurality of annular members spaced apart and tie bars connecting them, foot members on each side of said annular structure, each of said foot members comprising a plurality of plates secured to said annular members, and a cover structure comprising a curved plate having webs thereon, said curved plate being secured to said foot members and said webs cooperating with said annular members and the plates on said foot members to form ducts for air circulated between said laminations.

In witness whereof, I have hereunto set my hand this 16th day of June, 1927.

MARION A. SAVAGE.